United States Patent [19]

Grundmann

[11] Patent Number: 4,559,392

[45] Date of Patent: Dec. 17, 1985

[54] PROCESS FOR PRODUCING BROMOMETHYLATED POLYPHENYLENE ETHERS

[75] Inventor: Raban Grundmann, Marl, Fed. Rep. of Germany

[73] Assignee: Huels Aktiengesellschaft, Marl, Fed. Rep. of Germany

[21] Appl. No.: 652,539

[22] Filed: Sep. 20, 1984

[30] Foreign Application Priority Data

Sep. 21, 1983 [DE] Fed. Rep. of Germany ....... 3334068

[51] Int. Cl.[4] ....................... C08L 71/04; C08G 65/48
[52] U.S. Cl. ..................... 525/390; 525/391; 525/392; 525/395; 525/396; 525/397; 525/905
[58] Field of Search ............... 525/390, 397, 905, 391, 525/392, 395, 396; 568/633

[56] References Cited

U.S. PATENT DOCUMENTS

| | | | |
|---|---|---|---|
| 3,075,944 | 1/1963 | Wick et al. | 260/41 |
| 3,141,860 | 7/1964 | Sauer et al. | 260/33.8 |
| 3,250,739 | 5/1966 | Sauer et al. | 260/45.75 |
| 3,306,874 | 2/1967 | Hay | 260/47 |
| 3,306,875 | 2/1967 | Hay | 260/47 |
| 3,334,069 | 8/1967 | Borman | 525/390 |
| 3,658,945 | 4/1972 | Nakashio et al. | 260/876 R |
| 3,663,654 | 5/1972 | Haaf | 260/874 |
| 3,817,919 | 6/1974 | Nakashio et al. | 260/47 ET |
| 3,883,481 | 5/1975 | Kopetz et al. | 260/45.7 R |
| 4,058,504 | 11/1977 | Yonemitsu et al. | 260/47 ET |

FOREIGN PATENT DOCUMENTS

| | | |
|---|---|---|
| 2009065 | 1/1972 | Fed. Rep. of Germany . |
| 2047613 | 5/1975 | Fed. Rep. of Germany . |
| 2037510 | 12/1978 | Fed. Rep. of Germany . |
| 2616746 | 5/1979 | Fed. Rep. of Germany . |
| 3313864 | 4/1983 | Fed. Rep. of Germany . |

OTHER PUBLICATIONS

Ullmanns Encyklopadie der technischen Chemie, p. 18.
Kunststoff-Handbuch-Duroplaste, p. 22.
Houben-Weyl, Methoden der Organischen Chemie, pp. 484–487.

*Primary Examiner*—Theodore E. Pertilla
*Attorney, Agent, or Firm*—Millen & White

[57] ABSTRACT

Polyphenylene ethers, especially poly(2,6-dimethyl-1,4-phenylene) ether, are reacted, in the presence of carboxylic acids, with formaldehyde and hydrogen bromide, whereby 0.02–1 bromomethyl group is introduced, per phenyl nucleus, and a product is obtained containing up to 37.6% by weight of bromine, and losing 2–40% of its weight by thermogravimetric analysis at 250°–325° C. The resultant bromomethylated polyphenylene ethers are suitable, inter alia, as flame retardants.

13 Claims, No Drawings

PROCESS FOR PRODUCING BROMOMETHYLATED POLYPHENYLENE ETHERS

BACKGROUND OF THE INVENTION

The present invention relates to a process for producing bromomethylated polyphenylene ethers, and to the resultant ethers.

The polyphenylene ethers (PPE) produced according to U.S. Pat. Nos. 3,306,874 and 3,306,875 or also according to German Patent Application No. P 33 13 864.8, corresponding to U.S. Ser. No. 582,711, preferably from alkyl-substituted phenols, and using complex-forming agents, e.g. copper bromide and dibutylamine, under oxidizing condensation, are well-known compounds utilized especially in synthetic-resin blends and exhibiting a great variety of properties depending on the starting materials, substituents, co-condensates, or mixtures.

The literature, for example DAS's Nos. 2,009,065 and 2,047,613, discloses lists which include the bromomethyl group among many different substituents possible for polysubstituted polyphenylene ethers, but the only specific bromomethylated ether disclosed is poly(2,6-dibromomethyl-1,4-phenylene)ether. No example is disclosed for preparing this ether, nor is a general method disclosed for preparing bromomethylated polyphenylene ethers.

In contrast thereto, a large number of publications, including, e.g., DAS's Nos. 2,037,510 and 2,616,746, disclose halogenated polyphenylene ethers. These references require, in the case of a halogenated hydrocarbon residue as the substituent, at least two carbon atoms between the halogen atom and the phenol nucleus, and describe as remote the possibility of inserting bromomethyl groups.

Bromomethylation per se is a well-known reaction of aromatic compounds. A compilation can be found in Houben-Weyl, "Methoden der organischen Chemie" (Methods of Organic Chemistry), V/4: 484–487 (1960). However, page 487 teaches that phenols evade this fate by polycondensation with formaldehyde. Since this known, and here entirely undesirable, phenolic resin formation also occurs with phenol ethers, as disclosed in, e.g., "Kunststoff-Handbuch" (Plastics Manual), X: 22, Carl Hanser Publishers, 1968; and "Ullmanns Encyklopaedie der technischen Chemie" (Ullmann's Encyclopedia of Technical Chemistry) 4th ed./1979, 18:248, it was unexpected that PPE could be reacted with formaldehyde without undesirable crosslinking.

It is also surprising that bromomethylation of PPE can be performed with good conversion rates even if the polymeric material is insoluble or only sparingly soluble in the carboxylic acids, e.g., acetic acid or propionic acid, used in the present process.

Finally, it is known that ethers can be cleaved by means of hydrogen halides. Inasmuch as bromomethylation presupposes the presence of considerable amounts of hydrogen bromide, it is unexpected that reaction of PPE can take place with minimal to negligible cleavage.

In summation, everything was prejudicial to any expectation of success of the process of the invention.

OBJECTS OF THE INVENTION

One object of the present invention is to provide a process for bromomethylating polyphenylene ethers to introduce up to one bromomethyl group per phenylene group.

Another object of the invention is to provide a process for bromomethylating polyphenylene ethers which are insoluble or only sparingly soluble in lower carboxylic acids.

A further object of the invention is to provide bromomethylated polyphenylene ethers having a bromine content of 1–37.6% by weight, useful as fire retardant agents in resin compositions.

Upon further study of the specification and appended claims, further objects and advantages of this invention will become apparent to those skilled in the art.

SUMMARY OF THE INVENTION

These objects can be attained by providing a process for producing a bromomethylated polyphenylene ether, comprising the step of reacting a polyphenylene ether having the formula

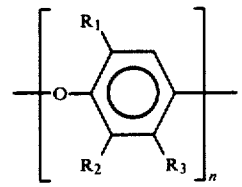

wherein $R_1$ and $R_2$ are each independently methyl, ethyl, propyl or butyl; $R_3$ is H, methyl, ethyl, propyl or butyl; and n is 3–600, with formaldehyde and hydrogen bromide, in the presence of a carboxylic acid, at a temperature of 20°–150° C., and under conditions such that 0.02–1 bromomethyl groups per phenylene group is introduced; and recovering resultant bromomethylated polyphenylene ether.

DETAILED DISCUSSION

Suitable as the starting materials for the present process are PPE's of the general formula

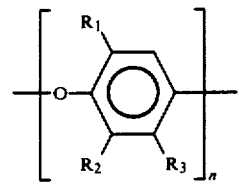

wherein $R_1$ and $R_2$ are each independently methyl, ethyl, propyl, or butyl; $R_3$ is H, methyl, ethyl, propyl or butyl (all isomers of propyl and butyl are included); and n is 3 to 600. Preferably, poly(2,6-dimethyl-1,4-phenylene)ethers are utilized, with a degree of polymerization n = 10–300. The degree of polymerization, n, is determined as a function of the viscosity in solution, which is determinable following DIN No. 53 726.

The molecular weight of usable PPE's is basically unlimited. PPE's having solution viscosities of between J = 0.1 and 0.9 dl/g, preferably between 0.4 and 0.65 dl/g, are very well suitable. However, the process is also particularly well suited for low molecular weight PPE's with a degree of polymerization n = 3 to 30. Solution viscosities are measured in chloroform at 30° C., according to the procedure of DIN No. 53 726.

Suitable PPE's for use as starting materials are described in the aforementioned patents and patent applications, whose disclosures are incorporated herein in their entirety by reference. Other such ethers are available by the self-condensation which happens by the reaction of oxygen with a phenol as 2-methylphenol, 2,3,6-trimethylphenol, 2,6-diethylphenol, 2,6-di-n-propylphenol, 2,6-di-i-propylphenol, 2,6-di-n-butylphenol or 2,6-di-tert.butylphenol; 2,6-dimethylphenol is preferred.

The reaction medium employed generally comprises one or more unsubstituted or substituted aliphatic or aromatic carboxylic acids of 2-12 carbon atoms, e.g. acetic acid, propionic acid, butyric acid, chloroacetic acid, benzoic acid, and the like. Also, mixtures with other solvents, such as chlorinated hydrocarbons, ethers, esters, or hydrocarbons, lead to good results. Preferably, the process is carried out in acetic acid, propionic acid, or an acetic acid/chloroform mixture. The quantity of liquid reaction medium employed is 2 to 20 times the amount of PPE, preferably 5 to 10 times the amount.

In general, PPE's are substantially insoluble or only sparingly soluble under the reaction conditions according to the invention. For this reason, the process is normally carried out in a suspension. Therefore, it is recommended to utilize PPE in comminuted form, preferably with a particle size of 2-200 $\mu$m, especially about 5-50 $\mu$m. PPE's of a low molecular weight, e.g., n=3-30, can also be predominantly or partially dissolved, especially in case of high dilution and elevated temperature.

However, it is unexpected and surprising that the reaction is also successful with undissolved PPE and particularly with a high conversion rate.

The formaldehyde can be added to the reaction mixture in the gaseous phase as well as in the dissolved state, but especially in solid, polymeric form, as paraformaldehyde. It is possible to introduce the entire amount at the beginning of the reaction with the PPE, or alternatively to feed formaldehyde in metered amounts during the course of the reaction, continuously or in incremental portions. Per phenylene group, 0.02-4 moles of formaldehyde, preferably 1-2.5 moles, are added.

The hydrogen bromide is fed in metered amounts during the course of the reaction, in the gaseous phase or as a solution, preferably as a solution in a carboxylic acid. The reaction can be performed under an excess pressure of HBr. It is also possible, for example, to liberate HBr from an inorganic bromide, e.g., NaBr, KBr, NH$_4$Br, by addition of a strong acid, e.g., H$_2$SO$_4$. In this case, the PPE is suspended, e.g., in acetic acid together with paraformaldehyde and finely powdered sodium bromide, and a mixture of concentrated sulfuric acid and acetic acid is added dropwise thereto at 60°-80° C. In total, 0.02-5 moles of HBr, preferably 1-2.5 moles, are added per phenylene group.

The reaction temperature ranges between 20° and 150° C., preferably between 60° and 130° C., and especially between 70° and 100° C. The duration of the reaction normally includes a metered feeding time of 0.5-8 hours and a further reaction period of 1-12 hours, depending on the size of the batch and on the degree of bromomethylation intended.

The reaction can be conducted batchwise or continuously.

The bromomethylated product is separated by filtration or centrifugation, washed neutral with dilute aqueous sodium carbonate and water, and dried. For purification, reprecipitation is recommended wherein, for example, chloroform can be used as the solvent, and methanol can be used as precipitant.

Where the reaction product is appreciably soluble in the medium, it is isolated by the addition of water with the effect of a precipitation, or by distillation of the solvent and cooling of the remaining product.

Yields of bromomethylated PPE's produced by the process of the invention are generally quite high, e.g., at least about 75%, preferably at least 90%, based on employed PPE.

Purity of the crude product after the filtration and the washing step is generally about 96% and more; by reprecipitation, using a mixture of methylenchloride and methanol as a solvent, e.g., it can be raised to 99% and more.

The bromomethylated PPE's are produced with substantially no crosslinking, or at most minimal crosslinking, and with minimal or negligible cleavage of the ether linkages. Thus, the product has a solution viscosity which is close to that of the starting PPE, and generally slightly lower.

The reaction products exhibit bromine contents of 1-37.6%, preferably 10-30%. A characteristic for the products is a weight loss during thermogravimetric analysis in a temperature range of 250°-325° C., lying between 2 and 40%, as can be seen from the table relating to the examples. The thermogravimetric analysis is performed by means of the thermogravimetric analyzator DuPont "TGA 950", using a heating rate of 10°/min.

The bromomethylated PPE's of this invention can be used as intermediates for the manufacture of functionalized polymers. Thus, it is possible, for example, to provide a chemical conversion of bromomethyl to hydroxymethyl or methylphosphonic acid ester and herefrom methylphosphonic acid, so that a large number of modified PPE's become accessible. So, bromomethylated PPE's can be converted to the phosphonic acid esters by reaction with triethylphosphite after the Michaelis-Arbusow-reaction. Other suitable methods for effecting such conversions can be found in, e.g., "Crowns Ethers and Phase Transfer Catalysis in Polymer Science" by L. J. Mathias et al., Polym. Scie. a. Techn., Vol. 24.

In particular, the PPE's of this invention are suitable directly as flame retardants for synthetic resins since, on the one hand, they are resistant to bleeding on account of their polymeric structure, and, on the other hand, they exhibit a decomposition temperature in the desired range, i.e., 250°-350° C. Typical resin compositions, comprising the bromomethylated PPE's of the invention as flame retardants, include, e.g., polyolefins, such as polyethylenes, polypropylenes, polybutenes and copolymers from them, PPE's, such as mentioned above for use as starting materials for the claimed bromination, and blends of such PPE's, all kinds of polyamides, of saturated and unsaturated polyesters, of polyurethanes, of polyepoxides and of natural rubber and of synthetic rubbers, such as SBR, EPM or EPDM; especially all kinds of polystyrene, its blends and its copolymers with other monomers, such as butadiene and acrylic compounds. The bromomethylated PPE's may be present in amounts from 3 to 30% in the plastic materials to give a certain effect, especially from 5 to 20%.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

In a 2-liter $N_2$-purged, stirred reactor with dropping funnel and reflux condenser, 144 g (1.2 mol) of finely pulverized poly(2,6-dimethyl-1,4-phenylene)ether (having a solution viscosity of J=0.6 dl/g in $CHCl_3$ at 30° C.) is suspended in 1 liter of acetic acid at 70° C. To the reaction suspension is added 45 g (1.5 mol) of paraformaldehyde and, during the course of 2 hours, 400 g of a 30% solution of HBr in acetic acid (1.5 mol HBr) is added dropwise thereto. The batch is stirred for 10 hours at 90° C. After cooling, the solid matter is separated, washed on a vacuum filter with a large amount of water, and then dried in a vacuum drying cabinet at 50° C. A light-beige solid is thus obtained.

Yield: 152 g (86% of theory); bromine content: 13.9%; viscosity number J=0.54 dl/g. The table shows the thermal stability.

EXAMPLE 2

Analogously to Example 1, 60 g (0.5 mol) of PPE (J=0.55 dl/g) in 500 ml of propionic acid is reacted with 60 g (2 mol) of paraformaldehyde and 122 g (1.5 mol) of HBr, dissolved in 300 ml of propionic acid, at 90° C. within 3 hours. The batch is stirred for 6 hours at 110° C. The mixture is worked up as set forth in Example 1.

Yield: 88 g of a beige solid; bromine content: 26%.

The bromine content reveals that more than every second phenylene nucleus carries a bromomethyl group. The thermal stability can be seen from the table.

EXAMPLE 3

A solution is prepared from 60 g of PPE (J=0.55 dl/g) in 500 ml of chloroform, combined with 300 ml of acetic acid, and the solution reacted in a 2-liter stirred apparatus at 60° C. with a total, in several portions, of 90 g (3 mol) of paraformaldehyde and 426 g (2.1 mol) of a 40% HBr in acetic acid during the course of 8 hours. The subsequent stirring period is 8 hours at 85° C. After vacuum-filtering and washing of the light-brown solid, the latter is dissolved in chloroform and precipitated in a 10-fold excess of acetone. The light-beige end product is dried at 50° C.

Yield: 91 g; bromine content: 29.8%; viscosity number J=0.51 dl/g.

EXAMPLE 4

In a 1-liter stirred apparatus with dropping funnel, 15 g (0.125 mol) of PPE (J=0.23 dl/g) is dissolved in 200 g of molten benzoic acid at 125° C. under nitrogen, combined with 15 g (0.5 mol) of paraformaldehyde, and, during the course of 3 hours, 150 g of a 27% HBr in propionic acid is added dropwise thereto. Then again 5 g of paraformaldehyde and 50 g of the HBr solution are added in metered amounts. The mixture is stirred for 8 hours at 110° C.

The mixture is diluted with 700 ml of acetic acid, the solid is vacuum-filtered and washed with a large amount of water. The dried product has a light-ochre color.

Yield: 26 g; bromine content: 36.3%; viscosity number J=0.18 dl/g.

A bromine content of 37.6% is calculated for a monobromomethylated PPE.

The thermal stability can be derived from the table.

TABLE

The thermogravimetric analysis was conducted with a TGA 950, DuPont, at a heating rate of 10° C./min (nitrogen atmosphere):

| Example | Weight Loss in % | | | | |
|---|---|---|---|---|---|
| | 250° C. | 275° C. | 300° C. | 325° C. | 350° C. |
| 1 | 1 | 1.5 | 7 | 12 | 16 |
| 2 | 1 | 3 | 12 | 23 | 28 |
| 4 | 2 | 7 | 20 | 35 | 40 |
| Pure PPE (for comparison) | 1 | 1 | 1 | 1 | 1 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed:

1. A process for producing a bromomethylated polyphenylene ether, comprising the step of reacting a polyphenylene ether having the formula

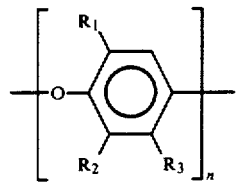

wherein $R_1$ and $R_2$ are each independently methyl, ethyl, propyl or butyl; $R_3$ is H, methyl, ethyl, propyl or butyl; and n is 3–600, with formaldehyde and hydrogen bromide, in the presence of a carboxylic acid, at a temperature of 20°–150° C., and under conditions such that 0.02–1 bromomethyl group per phenylene group is introduced; and recovering resultant bromomethylated polyphenylene ether.

2. The process of claim 1, wherein said polyphenylene ether is poly(2,6-dimethyl-1,4-phenylene)ether with a degree of polymerization, n, of 10–300.

3. The process of claim 1, wherein said carboxylic acid is acetic acid, propionic acid or benzoic acid.

4. The process of claim 1, wherein formaldehyde is provided as paraformaldehyde.

5. The process of claim 1, wherein the hydrogen bromide is introduced as a gas into a mixture of polyphenylene ether and formaldehyde.

6. The process of claim 1, wherein the hydrogen bromide is introduced as a solution in a carboxylic acid.

7. The process of claim 1, wherein said polyphenylene ether is substantially insoluble or only sparingly soluble in the reaction medium.

8. The process of claim 1, wherein the polyphenylene ether is comminuted, with an average particle size of 2–200 μm.

9. A bromomethylated polyphenylene ether, produced by a process comprising the step of reacting a polyphenylene ether having the formula

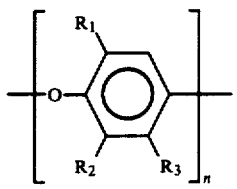

wherein $R_1$ and $R_2$ are each independently methyl, ethyl, propyl or butyl; $R_3$ is H, methyl, ethyl, propyl or butyl; and n is 3–600, with formaldehyde and hydrogen bromide, in the presence of a carboxylic acid, at a temperature of 20°–150° C., and under conditions such that 0.02–1 bromomethyl group per phenylene group is introduced; and recovering resultant bromomethylated polyphenylene ether; wherein said bromomethylated polyphenylene ether has a bromine content of 1–37.6% by weight, and a thermogravimetric weight loss of 2–40%, at a temperature of 250°–325° C.

10. A bromomethylated polyphenylene ether having a bromine content of 1–37.6% by weight, and a thermogravimetric weight loss of 2–40%, at a temperature of 250°–325° C.

11. In a synthetic resin, comprising an effective flame retardant amount of a bromine-containing organic flame retardant agent, the improvement wherein said bromine-containing organic flame retardant agent is the bromomethylated polyphenylene ether of claim 10.

12. A resin according to claim 11, wherein the bromomethylated polyphenylene ether comprises 3–30% of the composition.

13. A resin according to claim 11, wherein the bromomethylated polyphenylene ether comprises 5–20% of the composition.

* * * * *